US008228226B2

(12) United States Patent
Chan et al.

(10) Patent No.: US 8,228,226 B2
(45) Date of Patent: Jul. 24, 2012

(54) E-BAND RECEIVER AND BIT ERROR MEASUREMENT

(75) Inventors: Victor J. Chan, San Diego, CA (US); Gene Morgan, Lakeside, CA (US); Bruce Allen Brentlinger, San Diego, CA (US); Jimmy Hannan, San Diego, CA (US); Andrew Pavelchek, Poway, CA (US)

(73) Assignee: E-Band Communications Corp., San Diego, CA (US)

( * ) Notice: Subject to any disclaimer, the term of this patent is extended or adjusted under 35 U.S.C. 154(b) by 220 days.

(21) Appl. No.: 12/271,689

(22) Filed: Nov. 14, 2008

(65) Prior Publication Data

US 2009/0184860 A1  Jul. 23, 2009

Related U.S. Application Data

(60) Provisional application No. 60/988,697, filed on Nov. 16, 2007.

(51) Int. Cl.
*G01S 13/00* (2006.01)
(52) U.S. Cl. .............................. 342/22; 342/73; 342/132
(58) Field of Classification Search .......... 370/310–350; 455/403–466; 375/219–223, 316–352; 342/21, 342/173
See application file for complete search history.

(56) References Cited

U.S. PATENT DOCUMENTS

| | | | | |
|---|---|---|---|---|
| 5,469,471 A * | 11/1995 | Wheatley, III | ................ | 370/335 |
| 2003/0058497 A1* | 3/2003 | Park et al. | ..................... | 359/127 |
| 2003/0058499 A1* | 3/2003 | Reingand et al. | ............. | 359/135 |
| 2004/0179491 A1* | 9/2004 | Hosomi | ........................ | 370/329 |
| 2004/0266343 A1* | 12/2004 | Fenk et al. | .................... | 455/12.1 |
| 2005/0169410 A1* | 8/2005 | Tanaka | ........................ | 375/346 |
| 2005/0170789 A1* | 8/2005 | Consolazio | .................... | 455/78 |
| 2006/0178142 A1* | 8/2006 | Lovberg et al. | ............... | 455/431 |
| 2006/0251421 A1* | 11/2006 | Arnon | ............................ | 398/73 |
| 2007/0153726 A1* | 7/2007 | Bar-Sade et al. | ............. | 370/329 |
| 2008/0064323 A1* | 3/2008 | Barda | ........................... | 455/3.01 |
| 2008/0088518 A1* | 4/2008 | Charash et al. | ............... | 343/757 |

* cited by examiner

*Primary Examiner* — Timothy A Brainard
(74) *Attorney, Agent, or Firm* — Mintz, Levin, Cohn, Ferris, Glovsky and Popeo, P.C.

(57) ABSTRACT

Methods and apparatus are provided to facilitate the alignment of an antenna. In one aspect, there is provided a transceiver. The transceiver may include an antenna and a downconverter module coupled to the antenna. The downconverter module may convert a signal received at the antenna to another signal. The downconverter module may measure received signal strength. The transceiver may also include a sequence detector for detecting an error rate of a sequence included in the other signal. The transceiver may also include an output module for providing an output representative the error rate, the received signal strength, and a combination of the error rate and the received signal strength. The provided output may be used to enable alignment of an antenna. Related apparatus, systems, methods, and articles are also described.

18 Claims, 4 Drawing Sheets

E-BAND RECEIVER AND BIT ERROR MEASUREMENT

CROSS REFERENCE TO RELATED APPLICATION

This application claims the benefit under 35 U.S.C. §119 (e) of the following provisional application, all of which is incorporated herein by reference in its entirety: U.S. Ser. No. 60/988,697, entitled "E-Band Receiver And Bit Error Rate Measurement", filed on Nov. 16, 2007.

FIELD

The present disclosure generally relates to receivers and, more particularly, E-band receivers.

BACKGROUND

"E-Band" refers to any frequency within the following ranges: 71 to 76 gigahertz (GHz), 81 to 86 GHz, and 92 to 95 GHz. Transmissions in this frequency range are characterized by relatively short distances, such as distances on the order of about 10 miles and antennas with relatively narrow beamwidths, when compared to lower frequency transmission. For example, E-band communications may be used to solve the so-called "last mile" access challenge in situations where fiber optic connectivity is either too expensive or not a viable option.

Recognizing the utility of E-Band communications, the Federal Communication Commission authorized rules for 13 GHz of spectrum in the E-Band frequency range (i.e., 71-76 GHz, 81-86 GHz, and 92-95 GHz) enabling multi-gigabit-per-second communications. This large amount of newly issued spectrum allows radio manufacturers to design low cost, multi-gigabit capacity wireless systems. Consequently, E-Band communication systems are being implemented using technologies, such as MMIC (monolithic millimeter wave integrated circuit) based wireless technology, to provide low cost and high performance communication systems.

An obstacle to using E-Band communications is the alignment of antennas used in the E-Band frequency range. Since the frequencies are relatively high, the beamwidth of the antennas used in E-Band communications have very narrow beamwidths, when compared to traditional microwave antennas. The narrow beamwidths of E-Band antennas make it more difficult to align the antenna. For example, when establishing an E-Band communication link using two E-Band transceivers, the antennas must be aligned to enable communications. Poor alignment may result in no signal or a degraded signal at the E-Band transceiver.

SUMMARY

The subject matter disclosed herein provides methods and apparatus for providing a receiver including at least one of a bit Error Rate (BER) measurement and a received signal strength measurement.

In one aspect, there is provided a receiver. The receiver may include an antenna and a downconverter module coupled to the antenna. The downconverter module may convert a signal received at the antenna to another signal. The downconverter module may measure received signal strength. The receiver may also include a sequence detector for detecting an error rate of a sequence included in the other signal. The receiver may also include an output module for providing an output representative of the error rate, the received signal strength, and a combination of the error rate and the received signal strength. The provided output may be used to align an antenna.

The subject matter described herein may be implemented to realize the advantage of enabling enhanced alignment of antennas by providing an indication representative of the quality of the alignment.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

Figure 1:
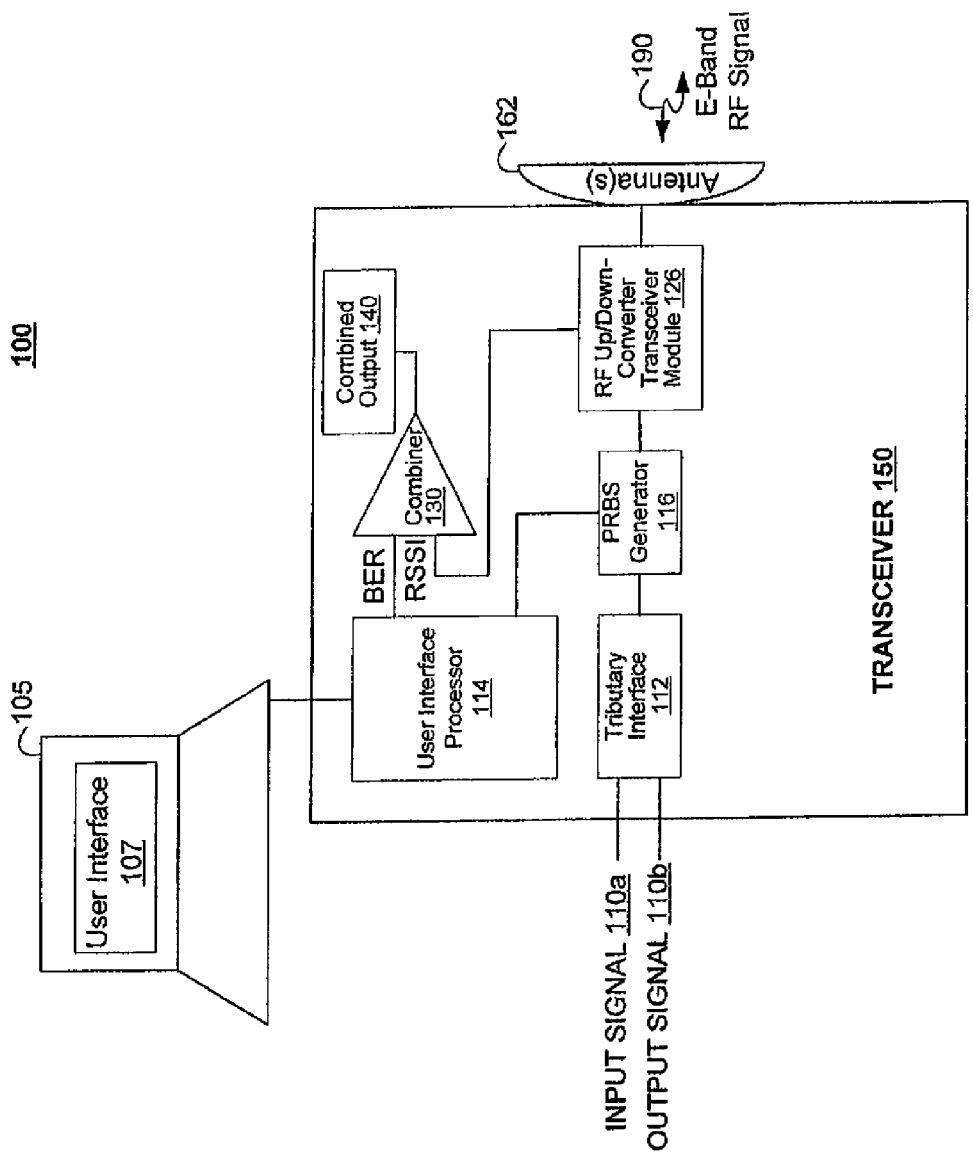
FIG. 1 depicts a block diagram of a system 100 including a transceiver 150 including a mechanism for measuring error rate (e.g., using a PRBS (pseudorandom bit sequence) generator 116) and for measuring signal strength (e.g., received signal strength indication (RSSI))

Like labels are used to refer to same or similar items in the drawings.

DETAILED DESCRIPTION

As frequencies increase, it becomes increasingly difficult to align antennas. For example, the acceptance angle of a directional receive antenna of a given size becomes narrower, making it difficult to properly align an antenna. More problematic, when millimeter wave (MMW), including E-Band, communication links are used, the beamwidth of the receive antennas are extremely narrow, making a difficult alignment task even more difficult.

Multi-path and reflections may also contribute to the difficulty in aligning antennas. Specifically, during a conventional antenna alignment, the antenna may be adjusted based on the strength of the signal received by the antenna (e.g., a received signal strength indication (RSSI)). For example, with a conventional approach, the antenna of a receiver is aligned (e.g., adjusted in azimuth and elevation) until the received signal strength measurement, as measured by RSSI, is optimum (e.g., at a maximum or near maximum)—indicating antenna alignment between the transmit antenna and the receive antenna. These conventional approaches may lead to improper alignment because multi-path and reflections may add to the signal strength—increasing RSSI at the receiver. However, the increased RSSI may not represent an optimum alignment since any increases in RSSI may be due to multi-path and reflections contributing to the received signal, resulting thus in higher received signal strength but an increase in bit errors of the underlying data in the received signal. As such, although signal strength (e.g., RSSI) may be optimum, the antenna alignment may not be optimum due to bit errors.

The subject matter described herein incorporates a bit error measurement (e.g., BER) mechanism, a signal strength measurement mechanism (e.g., RSSI), or a combination of both into a receiver, such as an E-Band receiver. By providing a receiver including bit error measurement mechanisms and/or signal strength measurement mechanisms, a technician may monitor the error rate (e.g., BER, severely-errored seconds, and the like) in real-time while aligning the pointing angle of an antenna. Moreover, the alignment may be further enhanced by using RSSI measurements of the received signal. In some implementations, the time required to align an antenna is reduced, and the quality of the alignment is enhanced. Moreover, including bit error measurement mechanisms (e.g., a PRBS (Pseudorandom Bit Sequence) generator capable of measuring bit errors) may eliminate the need for a separate, external BER tester. Since many antenna alignments are performed on a tower, providing a receiver including a bit error measurement and/or a signal strength measurement may make the alignment process easier in these high-altitude environments.

FIG. 1 depicts a transceiver 150 including a tributary interface 112, a PRBS generator 116, an RF up/downconverter transceiver 126, a user interface processor 114, a combiner 130, a combined output module 140, and a computer 105 including a user interface 107.

The transceiver 150 may be implemented to include at least one of a receiver and a transmitter. A transceiver refers to a radio that includes at least one of a transmitter and a receiver, and, in some cases, the transmitter and receiver are combined in a single, device. In some implementations, transceiver 150 may operate at one or more E-band frequencies. Although transceiver 150 may be implemented to transmit and receive RF signals 190 in the E-band frequency range, other frequencies may be used as well, such as MMW (e.g., 30 GHz to 300 GHz).

Tributary interface 112 receives an input signal 110a and converts it from a user provided format, such as an optical signal, to an electrical signal. For example, input signal 110a may be an optical signal, such as Gigabit Ethernet or Fibre Channel signal, and may include data. Tributary interface 112 may also receive an electrical signal (e.g., a signal received at antenna 162 and processed by RF up/downconverter transceiver 126) and convert that signal to an output signal 110b, such as Gigabit Ethernet or Fibre Channel signal. In some implementations, tributary interface 112 may be omitted or, alternatively, may be implemented as another type of interface.

PRBS generator 116 may be implemented to perform at least one of sequence detection and sequence generation. For example, PBRS generator 116 may generate a sequence of data (e.g., bits). Moreover, this data sequence may have properties, such as pseudo randomness. For example, a PRBS may be generated by PRBS generator 116 and transmitted by transceiver 150. Since the PRBS is a known (or a determinable) sequence, a receiver of the PRBS is able to determine how many bits in that PRBS had errors due to the transmission from transceiver 150 to the distant receiver (not shown). PRBS generator 116 may also receive one or more data sequences, such as a PRBS, and detect the number of bits of the data sequence that are in error. For example, PRBS generator 116 may generate and/or detect one or more of the following data sequences: an unframed PRBS of length $2^7$-1; an unframed PRBS of length $2^{23}$-1; an unframed PRBS of length $2^{31}$-1; predefined patterns of data; and special purpose data sequences, such as the Fibre Channel CRPAT, CJTPAT, and CSPAT patterns. Moreover, PRBS generator 116 may perform one or more of the following: provide clock and data recovery for Gigabit Ethernet and Fibre Channel; provide retiming of a signal; provide a repeater function; provide signal equalization; provide signal de-emphasis; and provide a driver (i.e., amplification) of a signal.

In some implementations, a Vitesse Semiconductor VSC8228 chip is used to generate and detect the PRBS, although other devices may be used as well. When a Vitesse Semiconductor VSC8228 chip is used as PRBS generator 116, the VSC8228 chip may be installed on a circuit board and may be coupled to a separate PIC controller to interface to user interface processor 114. Commands from user interface processor 114 (e.g., input or provided by a user of user interface 107) control the BER function of the VSC8228. The user interface processor 114 may also be used to transform the BER information provided by PRBS generator to a frequency signal, which may be provided to combiner 130. The frequency signal may be combined (e.g., summed) with the RSSI signal (e.g., an analog voltage) to provide a single, combined output at combined output 140. The combined output 140 may be provided at an output port (e.g., one or more connectors, one or more interfaces, and the like) to be used to view independently the BER, RSSI, or a combination of the two.

RF up/downconverter transceiver 126 is coupled to antenna 162 and may include at least one of a transmit path and receive path. The receive path receives an RF signal 190 from antenna 162 and may include a downconverter, demodulation components, and the like to provide demodulated data to tributary interface 112 (e.g., user data sent as output signal 110b) or PRBS generator 116 (e.g., a PRBS). The transmit path may be used to transmit a signal, such as data, a baseband signal, and the like, and convert that signal to another signal, such as an RF signal 190 for transmission by antenna 162. For example, the transmit path may include an upconverter, modulation components, amplifiers, and the like to modulate and upconvert data provided by the tributary interface 112 (or a PRBS provided by PRBS generator 116) and transmit an RF signal including the data (or the PRBS) via antenna 162. RF up/downconverter transceiver 126 may also include a power measurement device that measures the received signal strength (e.g., in terms of signal-to-noise ratio, dB, dBm, and the like) and provides the measured RSSI to combiner 130. In some implementations, RF up/downconverter transceiver 126 may receive an RF signal at a carrier frequency at an E-Band frequency. The received RF signal is downconverted from the carrier frequency to another signal, such as intermediate frequency signal. In some cases, the other signal at the intermediate frequency is downconverted to another, lower frequency to provide a baseband signal including data (or the PRBS) for use by PRBS generator 116. The received signal power may be measured at any location, including at the carrier frequency, intermediate frequency, or at baseband.

Antennas 162 may be implemented as one or more antennas. For example, antenna 162 may be implemented as any antenna suitable for use in the E-Band frequency range. Examples of such antennas include: a horn antenna, a dish antenna, and a multiple input multiple output antenna system. In some implementations, antenna 162 is coupled to transceiver 150 in a fixed manner. When this is the case, aligning antenna 162 requires aligning the antenna 162 and the coupled transceiver 150. In other implementations, although antenna 162 is coupled to transceiver 150, antenna 162 may be aligned separately from transceiver 150. When this is the case, aligning antenna 162 includes only aligning antenna 162.

To transmit, RF up/downconverter transceiver 126 receives a signal (e.g., an input signal 110a or a PRBS generated by PRBS generator 116) and modulates that signal on to a carrier, which may be upconverted for transmission as another signal, such as RF signal 190.

To receive, RF up/downconverter transceiver 126 receives a signal from antenna 162), downconverts the signal (e.g., from an E-band frequency to an intermediate frequency) and then demodulates to provide another signal, such as a baseband signal (e.g., data and the like), so it can be processed by PRBS generator 116 (e.g., to detect any sequences, such as a PRBS) or provided to another device (e.g., to tributary interface 112 for conversion to output signal 110b).

User interface processor 114 may be used to interface to PRBS generator 116. Specifically, user interface processor 114 may enable selection of a type of PRBS for generation by PRBS generator 116. The generated PRBS may be transmitted through antenna 162 and RF up/downconverter transceiver 126. Moreover, user interface processor 114 may also receive information regarding a PRBS detected by PRBS generator 116 and provide the information to user interface 107 for presentation and/or provide the information to combiner 130 for combining with other information, such as RSSI information. For example, user interface 107 may be used to select a type of PRBS sequence (e.g., a length or a type of pattern). When selected, user interface 107 provides an indication of the selection to user interface processor 114, where the selection is transformed into commands for PRBS generator 116. In some implementations, user interface processor 114 may be coupled to, or include, a PIC (Peripheral Interface Controller) microcontroller to interface to PRBS generator 116.

When a PRBS is detected by PRBS generator 116, an error rate may be determined for the detected PRBS. The determined error rate may be provided to user interface processor 114, which provides the error rate to combiner 130. For example, the BER determined by PRBS generator 116 may be provided to combiner 130 as an analog signal (e.g., a BER value having a corresponding analog frequency value, a voltage value, and the like).

For a signal received at antenna 162, combiner 130 may be used to combine the BER detected by PRBS generator 116 and the RSSI measured for the received signal. This combined output signal may be provided as combined output 140. When a user is aligning antenna 162, the combined output measurement may include error rate information (e.g., BER), signal strength information (e.g., RSSI), or a combination of the two. This combined measurement of BER and RSSI may enhance the alignment of antenna 162 in the presence of multi-path and reflections since an optimum received power measurement, such as RSSI, is not the only factor considered during antenna alignment, as BER is also a factor used to align the antenna.

Although combiner 130 is depicted in FIG. 1, combiner 130 may be implemented as any mechanism for combining the BER and RSSI information. For example, combiner 130 may be implemented as one or more of the following: a summing amplifier, discrete logic, and digital implementations (e.g., converting the BER and RSSI information into a digital form and combining them digitally).

Moreover, although combined output 140 is depicted in FIG. 1, transceiver 150 may provide individual outputs for the BER and RSSI as well. For example, a voltage and/or frequency output proportional to the BER may be provided as combined output 140 to enable use of a voltmeter or a frequency counter as the real-time indicator of the BER during antenna alignment. If a frequency signal is utilized, an audio loudspeaker or headphones may be used to permit alignment without the need to view a meter, which may be difficult to read in bright daylight. A user aligning the antenna may listen for a change in an audio tone or a frequency of ticks indicating a change in the BER. If a frequency signal is utilized for BER, audio intensity may be used to represent RSSI (e.g., the louder the intensity of the audio, the higher the relative RSSI).

In some implementations, custom signals may be used to represent different values of BER, RSSI, and a combination of both. For example, if the BER exceeds a threshold minimum, a ring tone may be broadcast as an audio signal. In some implementations, user interface 107 also presents detailed output information representative of the BER and/or RSSI. For example, during testing, user interface 107 may present the real-time error rate and RSSI both numerically and graphically, e.g., with a bar graph, using colors, etc.

Figure 2:
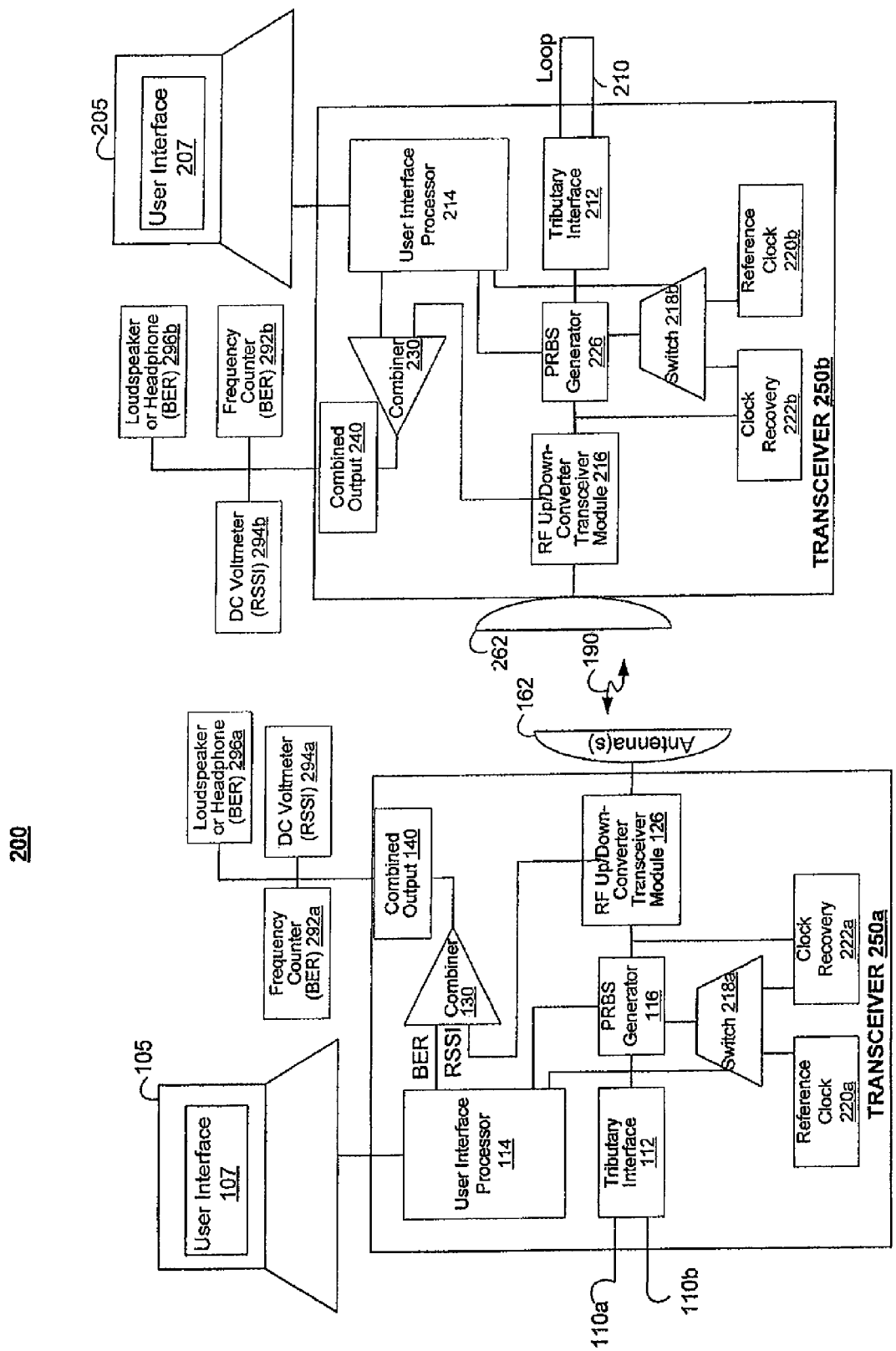
FIG. 2 depicts a block diagram of a system 200 including transceivers 250a-b, both of which include mechanisms for measuring error rate and for measuring signal strength.

FIG. 2 depicts two transceivers 250*a* and *b*. The transceivers 250*a-b* are similar to transceiver 150 in many respects. However, transceivers 250*a-b* each include a switch, such as a multiplexer or switches 218*a-b*, for selecting between a reference clock, such as reference clocks 220*a-b*, and a clock recovery module, such as clock recovery modules 222*a-b*.

Switches 218*a-b* enable loop back testing (e.g., loop 210), as described further below. Moreover, transceivers 250*a-b* depict additional features, such as frequency counter 292*a-b*, a voltmeter 294*a-b* to present RSSI information, and a loudspeaker 296*a-b* to provide an audio indication of the RSSI, BER, or a combination of the two.

Switches 218*a-b* may be used to switch between reference clocks 220*a-b* and clock recovery modules 222*a-b*. Reference clocks 220*a-b* provide reference clocks for communications between transceiver 250*a* and 250*b*. When clock recovery 222*a-b* is used, the transceiver using clock recovery is able to recover a clock signal from a signal received from the antenna and RF up/downconverter transceiver.

In some implementations, user interface 107 sends commands to the PRBS generator 116. The commands select that a BER should be performed between the transceivers 250*a-b*. In some cases, user interface 107 may command that a loop back test be performed using BER and RSSI to test the RF communication links between transceiver 250*a* and transceiver 250*b*. FIG. 2 depicts a loop 210 to enable testing of both transceiver 250*a* and transceiver 250*b*. Although FIG. 2 depicts loop 210 at tributary interface 212, such a loop may be implemented at other locations in transceiver 250*b*.

Although FIG. 2 depicts transceivers 250*a-b* implemented using similar components, in some implementations, transceivers 250*a-b* may be implemented differently. Moreover, during a test of transceivers 250*a-b*, the transceivers 250*a-b* may be configured differently. The systems 100 and 200 depicted at FIGS. 1 and 2 are block diagrams representations and may include additional components, connectors, and the like. Furthermore, one or more aspects of systems 100 and 200 may be implemented as hardware, software, and firmware.

For example, transceiver 250*b* may provide a loop to return any received test sequences (e.g., a PRBS) to transceiver 250*a*.

In a so-called "full loop back," PRBS generator 116 receives a command from user interface processor 114 to ignore (e.g., inhibit) any data from input signal 110*a* and tributary interface 112. PRBS generator 116 also receives a command to generate a data sequence (e.g., a PRBS) based on reference clock 220*a* and provide the generated PRBS to RF up/downconverter transceiver 126. RF up/downconverter transceiver 126 modulates and upconverts the generated bit sequence for transmission at antenna 162. The transmitted signal may be transmitted as RF signal 190 in the E-band frequency range, although other frequencies may be used as well.

Transceiver 250*b* receives the RF signal 190 at antenna 262. Antenna 262 is coupled to RF up/downconverter transceiver module 216, so that the received signal may be downconverted and demodulated. The demodulated signal includes the data sequence (e.g., a PRBS) transmitted by transceiver 250*a*. In full loop back, PRBS generator 226 allows the PRBS transmitted by transceiver 250*a* to pass from up/downconverter transceiver 216 to tributary interface 212, where a loop 210 is provided. The loop 210 enables the PRBS transmitted by transceiver 250*a* to be looped back through the transmit path of transceiver 250*b* (e.g., passing through PRBS generator 226 and modulated and upconverted for transmission by RF up/downconverter transceiver 216 and antenna 262). In some implementations, user interface 107 and/or user interface processor 114 remotely controls whether loop 210 should be applied.

Transceiver 250*a* receives from transceiver 250*b* the looped back PRBS. The PRBS is received by PRBS generator 116 through antenna 162 and RF up/downconverter transceiver 126. PRBS generator 116 detects the received PRBS. PRBS generator 116 then detects any bits in the sequence (e.g., the PRBS) that are in error. PRBS generator 116 provides to user interface processor 114 information regarding the quantity of bit errors (e.g., the bit error count and/or BER). In some implementations, user interface processor 114 may calculate a BER from the quantity of bit errors. Any detected bit errors or determined BER may be provided to user interface 107 for presentation numerically and graphically at computer 105 (e.g., at a computer, a laptop, a handheld computer, or the like).

User interface processor 114 may also generate a frequency signal that is proportional to the error rate. The combiner 130 may combine the frequency signal representing BER with an analog voltage signal representing RSSI (e.g., an analog voltage proportional to measured received signal strength) of the signal received at antenna 162. The combined frequency signal and analog voltage signal provide a single output (e.g., combined output 140) that may be simultaneously connected to a DC voltmeter and a frequency counter. In this manner, a technician may monitor RSSI, BER, or a combination of both, when aligning an antenna, such as antenna 162, eliminating the need for a separate computer, such as computer 105.

A full loop back may also be performed from transceiver 250b. When this is the case, user interface processor 214 controls PRBS generator 216 to generate a bit sequence (e.g., a PRBS) for transmission through RF up/downconverter transceiver 216 and antenna 262 and detect the PRBS received during the full loop back of transceiver 250a. In this case, transceiver 250a would include a loop similar to the one described above with respect to loop 210. Any detected bit errors or determined BER may be provided to user interface 207 for presentation numerically and graphically at computer 205 (e.g., at a computer, a laptop, a handheld computer, or the like).

For example, transceiver 250b receives from transceiver 250a the looped back data sequence, e.g., the PRBS. The PRBS is received by PRBS generator 216 through antenna 262 and RF up/downconverter transceiver 226. PRBS generator 226 detects the received data sequence (i.e., a PRBS) to detect any bit errors. PRBS generator 226 provides to user interface processor 214 information representative of the quantity of bit errors (e.g., the real-time bit error count and BER). Any detected bit errors or determined BER may be provided to user interface 207 for presentation numerically and graphically at computer 205 (e.g., a computer, a laptop, a handheld computer, or the like).

User interface processor 214 may also generate a frequency signal that is proportional to the error rate. The combiner 230 may combine the frequency signal with an analog voltage representative of RSSI (e.g., an analog voltage proportional to measured received signal strength) of the signal received at antenna 262. The combined signal provides a single output (e.g., combined output 240) that may be simultaneously connected to a DC voltmeter and a frequency counter. In this manner, a technician may monitor both RSSI and BER when aligning an antenna, such as antenna 262.

In some implementations a so-called "uni-directional" test is performed. In the uni-directional test mode, both transceivers 250a-b are each configured to generate and detect the data sequence (e.g., a PRBS). Unlike the full loop back described above, the uni-directional mode tests each link separately, i.e., the downlink from transceiver 250a to transceiver 250b and the uplink from transceiver 250b to transceiver 250a.

In a unidirectional test, switch 218b is configured to select clock recovery 222b. In this manner, the entire system 200 uses one reference clock, thus the detectors in PRBS generators 116 and 226 may synchronize with the received data even when the pattern was not generated at the respective PRBS generators 116 and 226. Valid BER can be measured and displayed for each direction independently.

In a unidirectional test, PRBS generator 116 receives a command from user interface processor 114 to ignore any data from input signal 110a and tributary interface 112. PRBS generator 116 also receives a command to generate a data sequence (e.g., a PRBS) based on reference clock 220a and provide the generated PRBS to RF up/downconverter transceiver 126. RF up/downconverter transceiver 126 modulates and upconverts the generated bit sequence for transmission at antenna 162. The transmitted signal may be transmitted as RF signal 190 in the E-band frequency range, although other frequencies may be used as well.

Transceiver 250b receives the RF signal 190 at antenna 262. Antenna 262 is coupled to RF up/downconverter transceiver module 216, so that the received signal may be downconverted and demodulated. The demodulated signal includes the data sequence (e.g., a PRBS) transmitted by transceiver 250a. In unidirectional mode, clock recovery 222b receives from RF up/downconverter transceiver 216 a signal, such as data sequence (e.g., the PRBS generated by transceiver 250a), from which clock recovery 222b can recover a clock signal. Switch 218b selects clock recovery 222b, so that the recovered clock can be provided to PRBS generator 226. The recovered clock is used by PBRS generator 226 to detect the bit errors of the PRBS of the received signal and to generate another PRBS for transmission through antenna 262 and RF up/downconverter transceiver module 216. PRBS generator 216 may provide to user interface processor 214 information regarding the quantity of bit errors (e.g., the real-time bit error count and BER). In some implementations, user interface processor 214 may calculate a BER from the quantity of bit errors. Any detected bit errors or determined BER may be provided to user interface 207 for presentation numerically and graphically at computer 205 (e.g., at a computer, a laptop, a handheld computer, or the like). The detected errors or determined BER may also be transmitted to computer 105 and user interface 107 (e.g., through antennas 162 and 262 or through another network, such as the Internet). For example, the detected errors or determined BER may be transmitted to computer 105 and user interface 107 via an over-the-air management channel embedded in the data sent through antennas 162 and 262 or provided to a coupled network management host.

At transceiver 250a, the RF signal including the PRBS from transceiver 250b is received by PRBS generator 116 through antenna 162 and RF up/downconverter transceiver 126. PRBS generator 116 detects the PRBS and any bits that are in error. PRBS generator 116 provides to user interface processor 114 information regarding the quantity of bit errors (e.g., the real-time bit error count and BER). In some implementations, user interface processor 114 may calculate a BER from the quantity of bit errors. Any detected bit errors or determined BER may be provided to user interface 107 for presentation.

Figure 3:
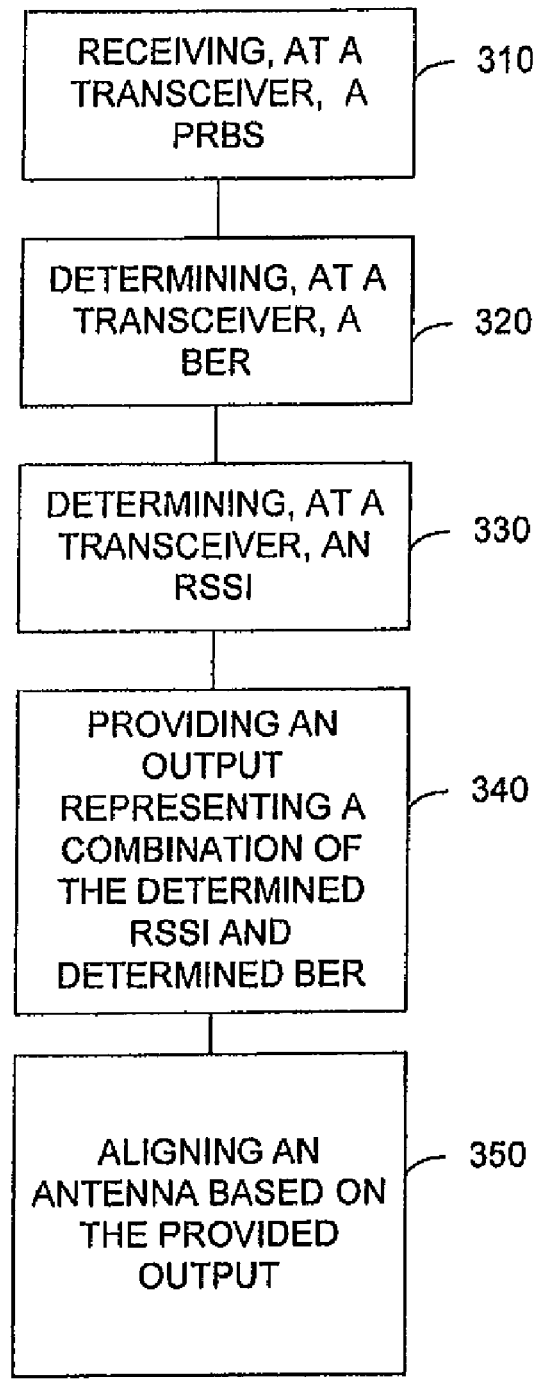
FIG. 3 depicts a process 300 for aligning an antenna using error rate and signal strength.

FIG. 3 depicts a process 300. At 310, a PRBS is received at a transceiver. At 320, a BER is determined based on the received PRBS. For example, a PRBS generator at the transceiver may detect the received PRBS and determine a quantity of bits in error. At 330, an indication of received signal strength (e.g., RSSI) may be determined (e.g., measured). For example, transceivers may include a power measurement mechanism at the antenna, the RF up/down conversion transceiver, and other locations as well. At 340, an output representing a determined RSSI and/or determined BER may be provided. At 350, the provided output may be used to align an antenna, such as an E-Band antenna coupled to the transceiver.

Figure 4:
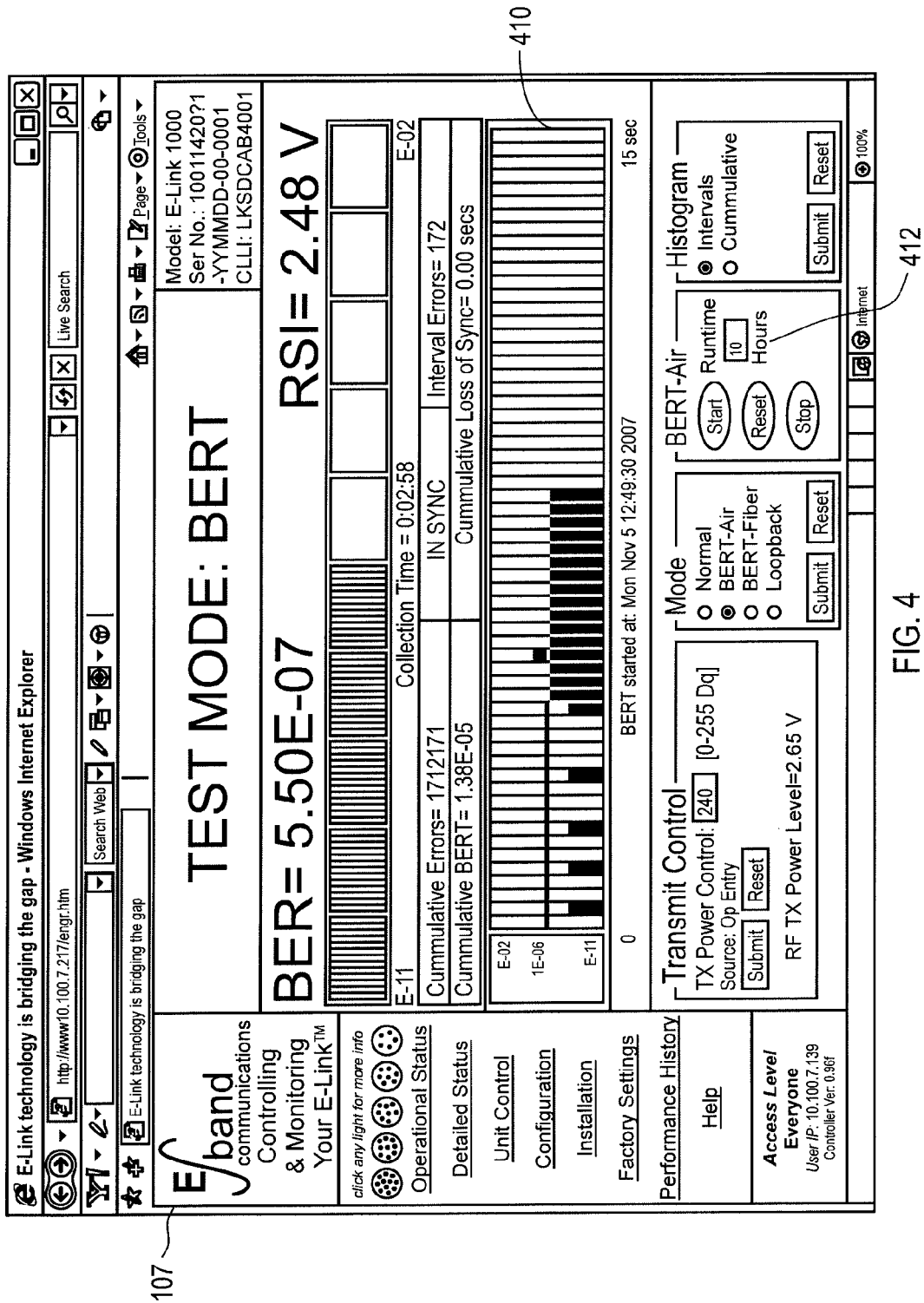
FIG. 4 depicts a user interface for presenting measured error rate and signal strength.

FIG. 4 depicts an example of a user interface 107 presented at computer 105. User interface 107 includes BER and RSSI information (e.g., BER=5.50E-07 and RSSI=2.48 V). User interface 207 may present information in a similar manner to FIG. 4. FIG. 4 also depicts a so-called strip chart 410. The strip chart 410 presents bit error rate measurements over time. For example, strip chart 410 presents bit error rate (e.g., E-11 to E-02) over time (e.g., 0 to 15 sec). Strip chart 410 depicts a 15 second interval of bit error rate measurements, although other intervals may be selected by providing another interval at 412.

The foregoing description is intended to illustrate but not to limit the scope of the invention, which is defined by the scope of the appended claims. Other embodiments are within the scope of the following claims.

What is claimed:

1. A receiver comprising:
   a downconverter for converting a signal received at an antenna to another signal and for measuring a signal strength;
   a sequence detector for detecting an error rate of a sequence included in at least one of the signal and the other signal;
   a combiner, coupled to a user interface processor and the downconverter, for combining the error rate provided by the user interface processor and the signal strength provided by the downconverter; and
   an output module for providing an output representative of the error rate and the signal strength to enable alignment of the position of the antenna operating at an E-band frequency.

2. The receiver of claim 1, wherein the sequence detector further comprises:
   detecting one or more of the following sequences: an unframed pseudo random bit sequence (PRBS) of length $2^7-1$; an unframed PRBS of length $2^{23}-1$; an unframed PRBS of length $2^{31}-1$; and a predefined pattern.

3. The receiver of claim 1, wherein the sequence detector further comprises:
   a sequence generator, coupled to the downconverter and a tributary interface, for generating one or more sequences.

4. The receiver of claim 3, wherein the sequence generator further comprises:
   generating one or more of the following sequences: an unframed pseudo random bit sequence (PRBS) of length $2^7-1$; an unframed PRBS of length $2^{23}-1$; an unframed PRBS of length $2^{31}-1$; and a predefined pattern.

5. The receiver of claim 1 further comprising:
   a user interface processor, coupled to the sequence detector, for receiving an indication representative of the error rate and for providing the indication to the user interface for presentation, the error rate representing a quantity of bit errors.

6. The receiver of claim 1, wherein the combiner further comprises:
   a summing amplifier for combining the error rate and the signal strength.

7. The receiver of claim 1, wherein the downconverter further comprises:
   an upconverter for converting an intermediate frequency signal including the sequence to a carrier signal at an E-band frequency.

8. The receiver of claim 1, wherein the downconverter further comprises:
   implementing the signal as a carrier signal and the other signal as an intermediate frequency signal; and
   converting the other signal to a baseband signal.

9. A method comprising:
   converting, at a receiver, a signal received at an antenna to another signal;
   measuring, at the receiver, a signal strength;
   detecting, at the receiver, an error rate of a sequence included in at least one of the signal and the other signal;
   combining the error rate, provided by a user interface processor, and the signal strength provided by a downconverter; and
   providing, at an output module of the receiver, an output representative of the error rate and the signal strength to enable alignment of the position of the antenna operating at an E-band frequency.

10. The method of claim 9 further comprising:
    detecting one or more of the following sequences: an unframed pseudo random bit sequence (PRBS) of length $2^7-1$; an unframed PRBS of length $2^{23}-1$; an unframed PRBS of length $2^{31}-1$; and a predefined pattern.

11. The method of claim 9 further comprising:
    generating one or more sequences.

12. The method of claim 11, wherein generating further comprises:
    generating one or more of the following sequences: an unframed pseudo random bit sequence (PRBS) of length $2^7-1$; an unframed PRBS of length $2^{23}-1$; an unframed PRBS of length $2^{31}-1$; and a predefined pattern.

13. The method of claim 9 further comprising:
    receiving, at a user interface processor coupled to a sequence detector, an indication representative of the error rate and for providing the indication to the user interface for presentation.

14. The method of claim 9, wherein combining further comprises:
    using a summing amplifier for combining the error rate and the signal strength.

15. The method of claim 9 further comprising:
    converting an intermediate frequency signal including the sequence to a carrier signal at an E-band frequency.

16. The method of claim 9 further comprising:
    implementing the signal as a carrier signal and the other signal as an intermediate frequency signal; and
    converting the other signal to a baseband signal.

17. The method of claim 9 further comprising:
    aligning an antenna based on the output.

18. The method of claim 9 further comprising:
    detecting, at the receiver, the error rate of the sequence, the sequence generated at another receiver, the other receiver recovering a clock to generate the sequence.

* * * * *